Feb. 12, 1929.  C. FERRETTIE  1,701,773
RUBBER REENFORCING
Filed Jan. 3, 1927
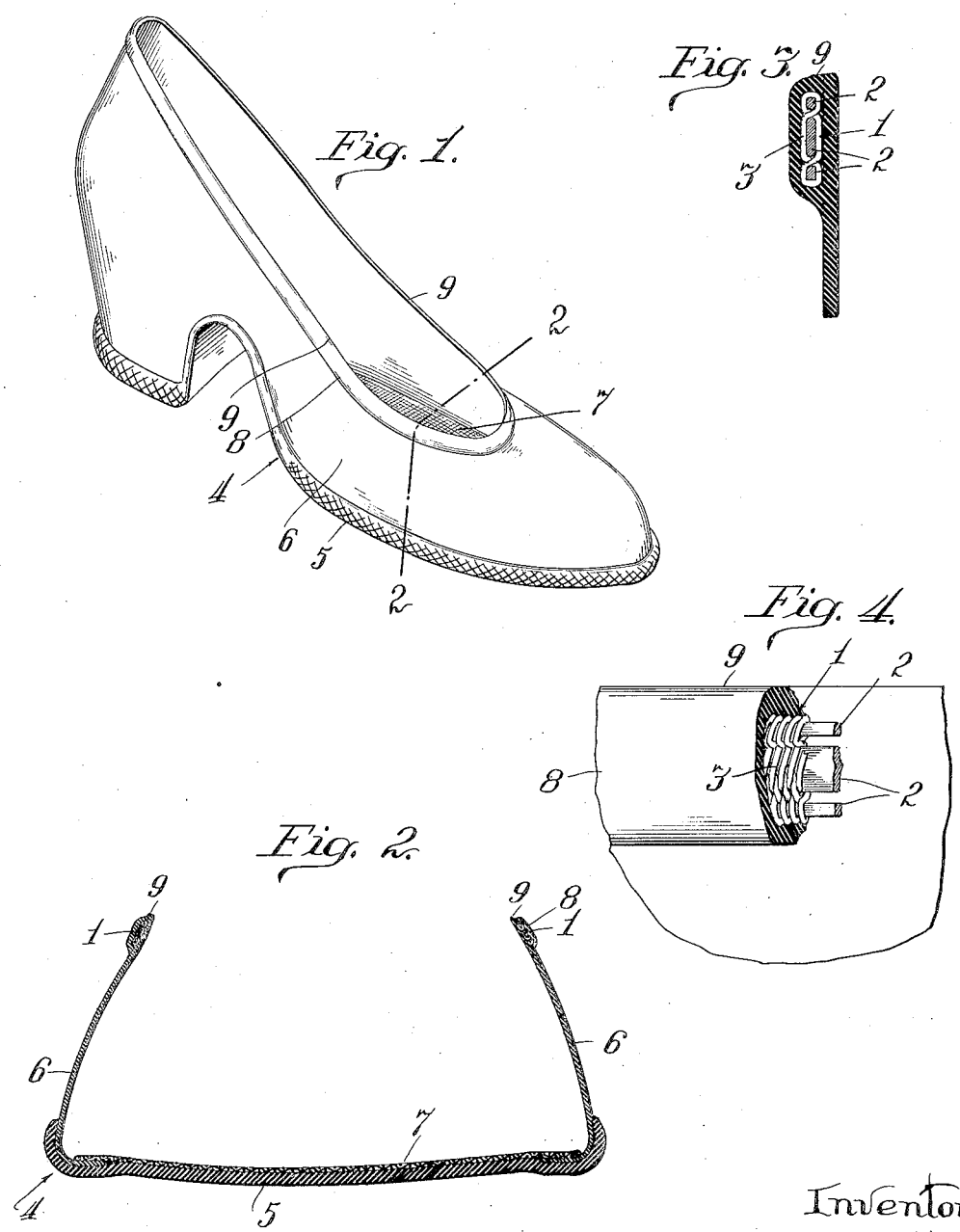
Inventor
Conrad Ferrettie
By Eugene M. Giles
Attorney Patented Feb. 12, 1929.

1,701,773

UNITED STATES PATENT OFFICE.

CONRAD FERRETTIE, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA.

RUBBER REENFORCING.

Application filed January 3, 1927. Serial No. 158,705.

My invention relates to a reenforcing for the edges of sheet rubber articles and has reference more particularly to a fabric tape which is embedded in the edge of the rubber and permits free stretching of the rubber without splitting or tearing of the rubber at the edge.

In many articles of sheet rubber in which the edge of the rubber is repeatedly stretched, as for example in rubber footwear, the reenforcing of the edge is a serious problem, as a slight nick or tear in the edge will soon increase or progress sufficiently to ruin the article. It is desirable to maintain the elasticity of the edge and to this end extra thickening of the rubber along the edge is usually employed for reenforcing but this is only moderately effective as a nick or tear when once started will, upon repeated or excessive stretching of the edge, break through the increased thickness of rubber and thereafter the progress of the tear is quite rapid. With my invention the tearing of the rubber is effectively avoided by using a reenforcing in the nature of a stretchy fabric in the edge which does not interfere with the desired elasticity but nevertheless affords a binding which will not permit a nick or tear to break therethrough.

The principal objects of my invention are to provide an improved reenforcing for the edges of sheet rubber parts; to retain the desired elasticity of the reenforced edge; to prevent tearing of the edge of the rubber when the latter is repeatedly or excessively stretched; to provide a reenforcing which may be readily embedded and concealed in the edge of the rubber in a neat and compact manner; to afford an effective reenforcing which is suitable for use in rubber footwear and the like; to provide an improved rubber which is highly elastic and adequately reenforced around the mouth to withstand severe stretching without injury; and in general, to provide a simple and inexpensive reenforcing which may be readily incorporated in the edges of sheet rubber parts.

On the drawing:

Fig. 1 is a perspective view of a rubber embodying my improvements;

Fig. 2 is a transverse sectional view on the line 2—2 of Fig. 1;

Fig. 3 is an enlarged sectional view of the reenforced edge of the rubber; and

Fig. 4 is an enlarged plan view of a fragmentary portion of the reenforced edge with a portion of the rubber covering over the reenforcing tape broken away to disclose details of the construction.

Referring to the drawing, I have for the purpose of illustration shown my improved reenforcing in the edge of the mouth of a rubber, which is unlined and of highly elastic construction and in which the reenforced edge is particularly advantageous, although it is to be understood that it may be used in other types of footwear or in other articles wherein the edges or other portions are subjected to sufficient stretching to require precautions against tearing of the rubber.

The reenforcing preferably consists of a flat tape which is indicated herein as a whole, by the reference numeral 1, and of an elastic character, which may consist of one or more strands 2 of very elastic vulcanized rubber woven in or wrapped with a braid 3. The braid 3 consists of a fine thread and is woven around the rubber strands 2 while the latter are stretched or elongated and when the tension of the rubber strands is relieved, the rubber strands return to repose and the surrounding braided tubular fabric is contracted with it affording a tape which when embedded in the edge of a rubber article in the contracted condition, is capable of stretching to the full extent of the edge of the rubber article and therefore does not restrict the stretching of the article.

The reenforcing is shown herein in connection with a low rubber shoe 4 or "rubber" as it is commonly called, having the sole 5 and upper 6 composed of special stretchy stock assembled on a last in the usual manner and vulcanized into a consolidated structure. Aside from the insole 7 which is of a stretchy fabric such as jersey cloth, the rubber is unlined and extremely flexible and elastic.

The reenforcing tape 1 which is embedded in the edge of the upper 6 around the mouth of the rubber is of suitable length so that when it is fully contracted it will fit around the mouth of the rubber, and is preferably made up in an endless form as for example with the ends overlapped and stitched together and the lapped and stitched ends are preferably located at the back of the rubber.

In constructing the reenforced edge, the tape 1 is first cemented and permitted to dry until it becomes tacky. It is then applied around the edge of the upper 6 on the last in the desired position. A strip of rubber the same as that from which the upper part of the overshoe is cut and a little wider than the tape 1, is then applied over the tape and the edges of this rubber strip are pressed down and joined, at opposite sides of the tape 1, to the rubber upper, a stitch wheel being preferably run along the edges so that they are firmly joined to the upper 6. The shoe is then cured on the last and the strip 8 thereby becomes integral with the rubber of the upper 6 and the tape 1 is thus embedded securely in the upper edge of the shoe. After curing the edge above the tape is trimmed off at 9 close to the upper edge of the tape 1.

With this construction of unlined rubber made of special stretchy stock a highly flexible and elastic rubber is provided, and with the tape 1 embedded in the edge, the latter is suitably and adequately reenforced so that the elasticity or stretching of the rubber is not restricted and at the same time a nick or tear which may start in the edge of the upper is obstructed by the tape 1 and prevented from increasing or progressing past the tape, and the most serious difficulty encountered in making rubber goods such as footwear is entirely overcome.

While I have shown and described my invention in a preferred form, I am aware that various changes and modifications may be made without departing from the principles of the invention, the scope of which is to be determined by the appended claims.

I claim as my invention:

1. In a shoe the combination of an upper of rubber composition and a stretchy flat braided tape embedded in an unstretched condition in the rubber composition along the edge of the upper so as to reenforce the edge without restricting the elasticity of the rubber composition.

2. In a shoe the combination of an upper of rubber composition and a tape consisting of one or more rubber strands and an extensible wrapping embedded in and consolidated with the composition along the edge of the upper.

3. In a shoe the combination of an upper of rubber composition, and an extensible braided tape with rubber strands therein embedded in the rubber composition along the edge of the upper.

4. In a shoe the combination of an upper of rubber composition, and a tape consisting of a fabric braided around stretched rubber strands, said tape being embedded in a relaxed condition in the rubber composition along the edge of the upper.

5. In a shoe the combination of an upper of rubber composition and an elastic tape embedded and vulcanized in a surrounding layer of the rubber composition along the edge of the upper.

6. In a shoe the combination of an upper of rubber composition having a mouth with a continuous surrounding edge of the rubber composition adapted to be stretched in applying and removing the shoe, and a continuous piece of elastic tape with fabric winding embedded in said edge of and surrounded by the rubber composition.

7. In a shoe, the combination of an upper of rubber composition and a relaxed rubber strand and enclosing extensible fibrous covering therefor surrounding by and consolidated with an integral edge portion of the rubber composition of the upper.

8. In a shoe, the combination of an unlined upper of rubber composition having an enlarged stretchy edge, said edge comprising a rubber strand enclosed in a fibrous winding and having a layer of rubber composition integral with the upper and surrounding the strand and winding and consolidated therewith into a unitary structure.

CONRAD FERRETTIE.